United States Patent
Xu et al.

(10) Patent No.: US 7,977,641 B2
(45) Date of Patent: Jul. 12, 2011

(54) SCINTILLATOR, ASSOCIATED DETECTING DEVICE AND METHOD

(75) Inventors: Wusheng Xu, Shanghai (CN); Zhongshi Liu, Shanghai (CN); Qun Deng, Shanghai (CN)

(73) Assignee: General Electric Company, Miskayuna, NY (US)

( * ) Notice: Subject to any disclaimer, the term of this patent is extended or adjusted under 35 U.S.C. 154(b) by 107 days.

(21) Appl. No.: 12/569,187

(22) Filed: Sep. 29, 2009

(65) Prior Publication Data

US 2011/0073770 A1    Mar. 31, 2011

(51) Int. Cl.
G01T 1/202    (2006.01)
(52) U.S. Cl. .................. 250/361 R; 250/370.11
(58) Field of Classification Search .............. 250/361 R, 250/370.11
See application file for complete search history.

(56) References Cited

U.S. PATENT DOCUMENTS

| | | | |
|---|---|---|---|
| 4,958,080 A | 9/1990 | Melcher | |
| 5,264,154 A * | 11/1993 | Akiyama et al. | 252/301.4 F |
| 6,437,336 B1 * | 8/2002 | Pauwels et al. | 250/361 R |
| 6,624,420 B1 | 9/2003 | Chai et al. | |
| 6,921,901 B1 * | 7/2005 | Chai et al. | 250/361 R |
| 7,026,756 B2 | 4/2006 | Shimizu et al. | |
| 7,151,261 B2 | 12/2006 | Chai | |
| 7,166,845 B1 | 1/2007 | Chai | |
| 7,189,340 B2 | 3/2007 | Shimomura et al. | |
| 7,274,045 B2 | 9/2007 | Chandran et al. | |
| 7,365,333 B1 | 4/2008 | Shah et al. | |
| 7,397,034 B2 | 7/2008 | Chai et al. | |
| 2003/0062465 A1 * | 4/2003 | Pauwels et al. | 250/205 |
| 2008/0131347 A1 | 6/2008 | Srivastava et al. | |

OTHER PUBLICATIONS

Zavartsev et al., "Czochralski Growth and Characterisation of Large Ce3+: Lu2SiO5 Single Crystals Co-Doped With Mg2+ or Ca2+ or Tb3+ for Scintillators", Journal of Crystal Growth, vol. 275, pp. 2167-2171, 2005.
Spurrier et al., "The Effect of Co-Doping on the Growth Stability and Scintillation Properties of Lutetium Oxyorthosilicate", Journal of Crystal Growth, vol. 310, pp. 210-2114, 2008.

* cited by examiner

*Primary Examiner* — David P Porta
*Assistant Examiner* — Marcus H Taningco
(74) *Attorney, Agent, or Firm* — Mary Louise Gioeni

(57) ABSTRACT

A scintillator is provided, comprising: a composition of formula $(Lu_{1-x-y-z}Ce_xIn_yM^1_z)_2SiO_5$, wherein $M^1$ is Y, Sc, Gd, or a combination thereof; $0.00001 < x < 0.05$; $0.000001 < y < 0.1$; and $0 <= z < 0.999989$. A detecting device comprising a crystalline structure of the above scintillator is also provided. A method of detecting energy with the above detecting device is provided, comprising: receiving radiation by the scintillator; and detecting photons with a photon detector coupled to the scintillator.

19 Claims, 1 Drawing Sheet

SCINTILLATOR, ASSOCIATED DETECTING DEVICE AND METHOD

BACKGROUND

Single crystal scintillation is a very simple but also very sensitive method of detecting high energy radiation such as x-rays, gamma-rays and high energy particles with energies exceeding a few kilo-electron volt (KeV). In the past century, a large number of crystals have been proposed for potential scintillating applications.

Some commonly used scintillator materials include thallium-activated sodium iodide (NaI(Tl)), bismuth germanate (BGO), cerium-doped gadolinium orthosilicate (GSO), cerium-doped lutetium orthosilicate (LSO) and cerium-doped lutetium yttrium orthosilicate (LYSO). While these known scintillator materials do have some desirable scintillation characteristics which make them suitable for certain applications, each of the materials possesses one or more deficiencies that limit their use in a variety of applications.

For example, medical imaging such as positron emission tomographs (PET) requires crystals with the highest light yield, narrowest energy resolution and fastest decay time. Moreover, PET also requires a crystal with good physical integrity and chemical inertness. However, few of the commercially available scintillator materials can provide all desired properties for PET.

There are some proposals to enhance performances of scintillators including, e.g., adding codopants into LSO and LYSO or treating (oxidizing/reducing) LSO and LYSO. These proposals still have improving spaces since they usually do not effectively decrease the decay time without adversely affecting the light output, do not have stable single crystal growth, and form defects due to non-equal valences in compositions thereof.

Thus, a need exists for improved scintillator compositions that can be efficiently and economically produced and that exhibit characteristics which enhance radiation detection, including, for example, short decay time while maintaining acceptable light output.

BRIEF DESCRIPTION

In accordance with embodiments described herein, a scintillator is provided, comprising: a composition of formula $(Lu_{1-x-y-z}Ce_xIn_yM^1_z)_2SiO_5$, wherein $M^1$ is Y, Sc, Gd, or a combination thereof; $0.00001 < x < 0.05$; $0.000001 < y < 0.1$; and $0 <= z < 0.999989$.

In accordance with embodiments described herein, a detecting device comprising a crystalline structure of the above scintillator is also provided.

In accordance with embodiments described herein, a method of detecting energy with the above detecting device is provided, comprising: receiving radiation by the scintillator; and detecting photons with a photon detector coupled to the scintillator.

DETAILED DESCRIPTION

Figure 1:
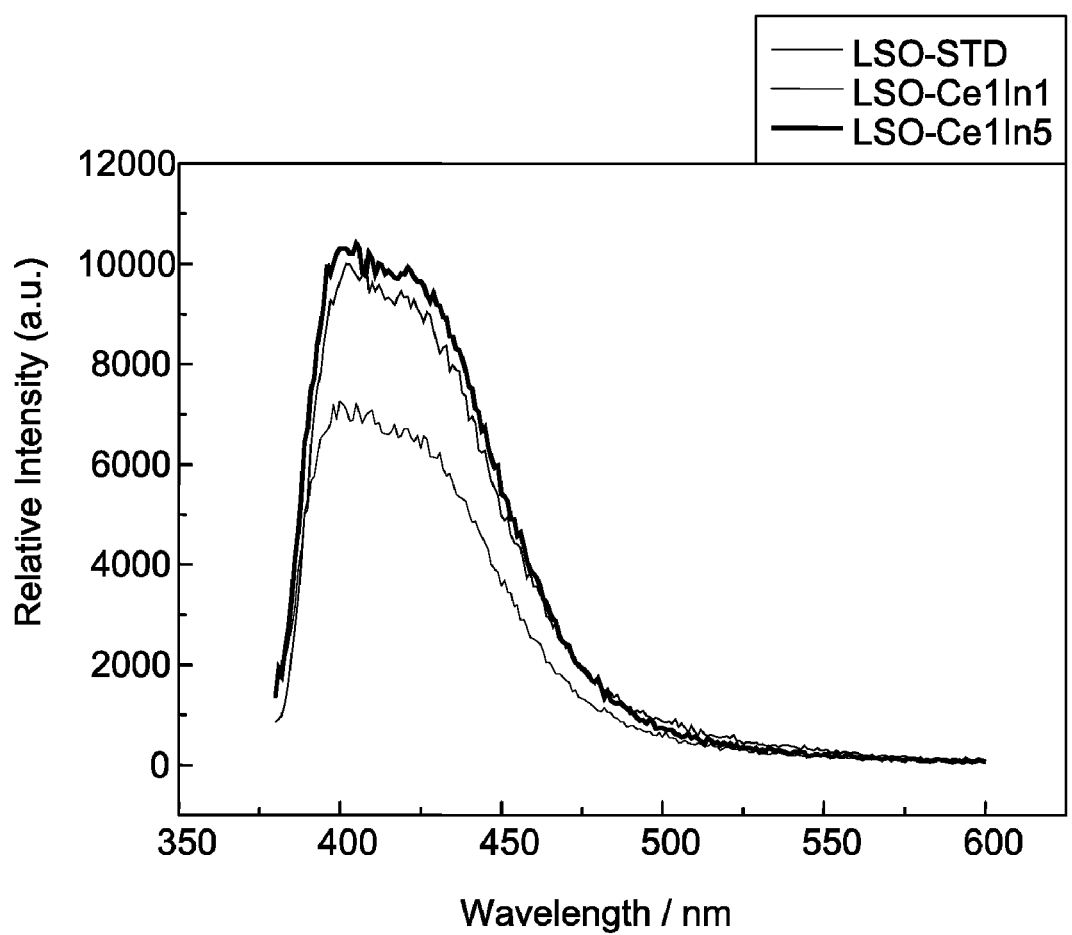
FIG. 1 shows the emission spectra of LSO:0.1% Ce (LSO-STD in FIG. 1) powder, LSO:0.1% Ce:0.1% In (LSO-Ce1In1 in FIG. 1) powder, LSO:0.1% Ce0.5% In (LSO-Ce1In5 in FIG. 1) powder excited by 360 nm.

In the following description, well-known functions or constructions are not described in detail to avoid obscuring the disclosure in unnecessary detail.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

In accordance with embodiments described herein, a scintillator is provided, comprising: a composition of formula $(Lu_{1-x-y-z}Ce_xIn_yM^1_z)_2SiO_5$, wherein $M^1$ is Y, Sc, Gd, or a combination thereof; $0.00001 < x < 0.05$; $0.000001 < y < 0.1$; and $0 <= z < 0.999989$.

The quantity of dopant usually will affect the performance of the material. For example, LSO doped with too much Ce will have self absorption of light and LSO doped with too little Ce will not generate acceptable light.

In another aspect, a detecting device comprising a crystalline structure of the above scintillator is also provided.

In accordance with embodiments described herein, a method of detecting energy with the above detecting device is provided, comprising: receiving radiation by the scintillator; and detecting photons with a photon detector coupled to the scintillator.

In some embodiments, $0.0001 < x < 0.05$. In some embodiments, $0.000001 < y < 0.0002$.

In some embodiments, the composition is of formula $(Lu_{0.994}Ce_{0.001}In_{0.005})_2SiO_5$ or $(Lu_{0.99932}Ce_{0.00064}In_{0.00004})_2SiO_5$.

In some embodiments, the composition is of formula $(Lu_{0.996}Ce_{0.001}In_{0.003})_2SiO_5$ or $(Lu_{0.99964}Ce_{0.00035}In_{0.00001})_2SiO_5$.

In some embodiments, the composition is of formula $(Lu_{0.949}Ce_{0.001}In_{0.05})_2SiO_5$ or $(Lu_{0.99945}Ce_{0.00041}In_{0.00014})_2SiO_5$.

In some embodiments, the composition is of formula $(Lu_{0.998}Ce_{0.001}In_{0.001})_2SiO_5$.

The detecting device detects high energy radiation such as x-rays, gamma-rays and high energy particles with energies exceeding a few kilo-electron volt (KeV). In some embodiments, the detecting device further comprises a photon detector optically coupled to the scintillator for producing an electrical signal in response to emission of a light pulse by the scintillator. In some embodiments, the photon detector is the photomultiplier or other photon detector, which includes a photomultiplier tube, a PIN diode, and an avalanche photo detector (APD) diode.

The following examples are included to provide additional guidance to those of ordinary skill in the art in practicing the claimed invention. Accordingly, these examples do not limit the invention as defined in the appended claims.

Synthesis $Lu_2O_3$ (17.332 g), 2.633 g $SiO_2$, 0.014 g $Ce_2O_3$ and 0.061 g $In_2O_3$ were mixed by grinding in a mortar. The mixed powders were filled in a balloon, and pressed into a rod under the pressure of 70 MPa using Hydrostatic Press Model HP-M-SD-200 from Riken Seiki CO. Ltd. The rod was sintered at 1400° C. for 10 hours to get a compound of formula $(Lu_{0.994}Ce_{0.001}In_{0.005})_2SiO_5$.

Lu$_2$O$_3$ was obtained from Beijing Founder Star Science & Technology Co. Ltd, Beijing, China. Ce$_2$O$_3$ and SiO$_2$ were obtained from Sinopharm Chemical Reagent Co. Ltd, Shanghai, China. In$_2$O$_3$ was got from Shanghai First Reagent Factory, Shanghai, China. Each of the materials has purity over 99.99%.

Crystal Growth

The sintered rod ((Lu$_{0.994}$Ce$_{0.001}$In$_{0.005}$)$_2$SiO$_5$) (referred hereinafter as LSO:0.1% Ce:0.5% In) was converted to single crystal in a 10000-H mode optical floating zone furnace from Crystal Systems Corp. (9633 Kobuchisawa, Yamanashi 408-0044, Japan) after four hours. The growth rate was 5 mm/h and the rotation rate was 15 rpm (round per minute) for upper and lower shafts in reverse directions.

Crystals made from materials having compositions of (Lu$_{0.996}$Ce$_{0.001}$In$_{0.003}$)$_2$SiO$_5$ (referred hereinafter as LSO0: 0.1% Ce:0.3% In), (Lu$_{0.949}$Ce$_{0.001}$In$_{0.05}$)$_2$SiO$_5$ (referred hereinafter as LSO:0.1% Ce:5% In), and (Lu$_{0.999}$Ce$_{0.001}$)$_2$SiO$_5$ (referred hereinafter as LSO:0.1% Ce), were synthesized and grown in similar ways except the materials used and stoichiometric ratios of the materials were different.

After cut and polished, the compositions, decay times and light outputs of the crystals were measured.

Compositions

The compositions of the crystals, materials, and percentages of In and Ce entering from the materials into the crystals are shown in table 1.

TABLE 1

| Raw material composition | Crystal composition | In enter crystal (%) | Ce enter crystal (%) |
|---|---|---|---|
| (Lu$_{0.999}$Ce$_{0.001}$)$_2$SiO$_5$ | (Lu$_{0.99979}$Ce$_{0.00021}$)$_2$SiO$_5$ |  | 21 |
| (Lu$_{0.996}$Ce$_{0.001}$In$_{0.003}$)$_2$SiO$_5$ | (Lu$_{0.99964}$Ce$_{0.00035}$In$_{0.00001}$)$_2$SiO$_5$ | 0.33 | 35 |
| (Lu$_{0.994}$Ce$_{0.001}$In$_{0.005}$)$_2$SiO$_5$ | (Lu$_{0.99932}$Ce$_{0.00064}$In$_{0.00004}$)$_2$SiO$_5$ | 0.80 | 64 |
| (Lu$_{0.949}$Ce$_{0.001}$In$_{0.05}$)$_2$SiO$_5$ | (Lu$_{0.99945}$Ce$_{0.00041}$In$_{0.00014}$)$_2$SiO$_5$ | 0.28 | 41 |

It is seen that percentages of Ce in crystals are increased when In was added as a codopant compared with when In was not added as a codopant.

Light Output

A 10 μCi $^{137}$Cs source was employed to excite the crystal. Teflon tape was used to collect the light from the crystal. One end of the crystal was coupled with an XP 2020 photomultiplier tube (PMT) from Photonis having an Ortec® 269 base by a silicon oil glue having Brookfield viscosity of 5000 cp. A high voltage (ORTEC®-556), a preamplifier (Ortec®-113), an amplifier (ORTEC®-575A), and a multichannel analyzer (MCA, Ortec® PCI-8k) were used. A personal computer (PC) was used to record the spectrum after the electric signal was converted to digital signal by the MCA. The light outputs of crystal samples of LSO:0.1% Ce, LSO:0.1% Ce:0.3% In, LSO:0.1% Ce:0.5% In and LSO:0.1% Ce:5% In are shown in table 2. Light outputs of LSO:0.1% Ce:0.3% In and LSO: 0.1% Ce:0.5% In are not lower than that of LSO:0.1% Ce and even a little higher than that of LSO:0.1% Ce partly because more Ce enters into the crystals. Crystals doped with lower concentration of In improve in light outputs thereof compared with crystal without In (LSO:0.1% Ce), even high concentration doped In sample also exhibit reasonable light output.

TABLE 2

| Samples | Light Output, relative to LSO: 0.1% Ce |
|---|---|
| LSO: 0.1% Ce | 1 |
| LSO: 0.1% Ce: 0.3% In | 1.25 |
| LSO: 0.1% Ce: 0.5% In | 1.05 |
| LSO: 0.1% Ce: 5% In | 0.42 |

Emission Spectra and Decay Time

FLS920 Spectrometer from Edinburgh Instrument Ltd. was employed for the measurements of emission spectra and decay curves.

The emission spectra of LSO:0.1% Ce powder (LSO-STD in FIG. 1), LSO:0.1% Ce:0.1% In powder (LSO-Ce1In1 in FIG. 1), LSO:0.1% Ce0.5% In powder (LSO-Ce1In5 in FIG. 1) excited by 360 nm are shown in FIG. 1. Emission spectra of LSO:0.1% Ce:0.1% In powder and LSO:0.1% Ce0.5% In powder correspond to that of LSO:0.1% Ce powder very well. The compound powders were obtained by grinding the materials having the corresponding compositions followed by sintering at 1400° C. for 10 hours.

The decay times of LSO:0.1% Ce crystal, LSO:0.1% Ce:0.3% In crystal, LSO:0.1% Ce:0.5% In crystal, LSO:0.1% Ce:5% In crystal, LSO:0.1% Ce powder, LSO:0.1% Ce:0.1% In powder, LSO:0.1% Ce:0.3% In powder and LSO:0.1% Ce:0.5% In powder are shown in table 3. The decay times of LSO:0.1% Ce:0.3% In crystal, LSO:0.1% Ce:0.5% In crystal, and LSO:0.1% Ce:5% In crystal are shorter than that of LSO:0.1% Ce crystal. The decay times of LSO:0.1% Ce:0.1% In powder, LSO:0.1% Ce:0.3% In powder and LSO: 0.1% Ce:0.5% In powder are shorter than that of LSO:0.1% Ce powder.

TABLE 3

| Crystal Samples | Decay time (ns) | Powder Samples | Decay time (ns) |
|---|---|---|---|
| LSO: 0.1% Ce | 35 | LSO: 0.1% Ce | 28 |
| LSO: 0.1% Ce: 0.3% In | 33 | LSO: 0.1% Ce: 0.1% In | 19 |
| LSO: 0.1% Ce: 0.5% In | 31 | LSO: 0.1% Ce: 0.3% In | 15 |
| LSO: 0.1% Ce: 5% In | 23 | LSO: 0.1% Ce: 0.5% In | 13 |

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A scintillator comprising a composition of formula (Lu$_{1-x-y-z}$Ce$_x$In$_y$M$^1_z$)$_2$SiO$_5$, wherein
M$^1$ is Y, Sc, Gd, or a combination thereof;
0.00001<x<0.05;
0.000001<y<0.1; and
0<=z<0.999989.

2. The scintillator of claim 1, wherein $0.0001 < x < 0.05$.

3. The scintillator of claim 1, wherein $0.000001 < y < 0.0002$.

4. The scintillator of claim 1, wherein the composition is of formula $(Lu_{0.994}Ce_{0.001}In_{0.005})_2SiO_5$.

5. The scintillator of claim 1, wherein the composition is of formula $(Lu_{0.996}Ce_{0.001}In_{0.003})_2SiO_5$.

6. The scintillator of claim 1, wherein the composition is of formula $(Lu_{0.949}Ce_{0.001}In_{0.05})_2SiO_5$.

7. The scintillator of claim 1, wherein the composition is of formula $(Lu_{0.998}Ce_{0.001}In_{0.001})_2SiO_5$.

8. The scintillator of claim 1, being a single crystal of formula $(Lu_{0.99932}Ce_{0.00064}In_{0.00004})_2SiO_5$.

9. The scintillator of claim 1, being a single crystal of formula $(Lu_{0.99964}Ce_{0.00035}In_{0.00001})_2SiO_5$.

10. The scintillator of claim 1, being a single crystal of formula $(Lu_{0.99945}Ce_{0.00041}In_{0.00014})_2SiO_5$.

11. A detecting device comprising a crystalline structure of the scintillator of claim 1.

12. The detecting device of claim 11, further comprising a photon detector optically coupled to the scintillator for producing an electrical signal in response to emission of a light pulse by the scintillator.

13. The detecting device of claim 11, wherein $0.0001 < x < 0.05$.

14. The detecting device of claim 11, wherein $0.000001 < y < 0.0002$.

15. The detecting device of claim 11, wherein the composition is of formula $(Lu_{0.99932}Ce_{0.00064}In_{0.00004})_2SiO_5$.

16. The detecting device of claim 11, wherein the composition is of formula $(Lu_{0.99964}Ce_{0.00035}In_{0.00001})_2SiO_5$.

17. The detecting device of claim 11, wherein the composition is of formula $(Lu_{0.99945}Ce_{0.00041}In_{0.00014})_2SiO_5$.

18. The detecting device of claim 11, wherein the scintillator is single crystal.

19. A method of detecting energy with the detecting device of claim 11, comprising:
   receiving radiation by the scintillator; and
   detecting photons with a photon detector coupled to the scintillator.

* * * * *